US012718075B2

(12) United States Patent
Hajimolahoseini et al.

(10) Patent No.: US 12,718,075 B2
(45) Date of Patent: Aug. 25, 2026

(54) METHODS, SYSTEMS, AND MEDIA FOR COMPUTER VISION USING 2D CONVOLUTION OF 4D VIDEO DATA TENSORS

(71) Applicants: Habib Hajimolahoseini, Oakville (CA); Kaushal Kumar, Richmond Hill (CA); Gordon Deng, Gatineau (CA)

(72) Inventors: Habib Hajimolahoseini, Oakville (CA); Kaushal Kumar, Richmond Hill (CA); Gordon Deng, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1087 days.

(21) Appl. No.: 17/502,588

(22) Filed: Oct. 15, 2021

(65) Prior Publication Data

US 2023/0124075 A1 Apr. 20, 2023

(51) Int. Cl.
*G06N 3/0464* (2023.01)
*G06N 3/049* (2023.01)
(Continued)

(52) U.S. Cl.
CPC .......... *G06N 3/049* (2013.01); *G06N 3/0464* (2023.01); *G06N 3/10* (2013.01)

(58) Field of Classification Search
CPC .................................................. G06N 3/0464
See application file for complete search history.

(56) References Cited

U.S. PATENT DOCUMENTS

2020/0042867 A1 2/2020 Shao
2020/0210805 A1 * 7/2020 Drozdowski ............ G06N 3/04
(Continued)

FOREIGN PATENT DOCUMENTS

CN 108961317 A 12/2018
CN 112257857 A 1/2021
(Continued)

OTHER PUBLICATIONS

Sun, Lin et al.; "Human Action Recognition using Factorized Spatio-Temporal Convolutional Networks"; 2015; IEEE; 2015 IEEE International Conference on Computer Vision; 4598-4605 (Year: 2015).*

(Continued)

*Primary Examiner* — David Yi
*Assistant Examiner* — Ezra J Baker

(57) ABSTRACT

Methods, systems and media for computer vision using 2D convolution of 4D video data tensors are described. 3D convolution operations performed on 5D input tensors are simulated by performing 2D convolution of 4D tensors instead. A convolution block of a CNN performs two parallel operations: a spatial processing branch performs spatial feature extraction on a 4D tensor using 2D convolution, whereas a temporal processing branch performs temporal feature extraction on a different 4D tensor using 2D convolution. The output tensors of the spatial processing branch and the temporal processing branch are combined to generate an output tensor of the convolution block. The convolution block may include additional operations such as reshaping and/or further convolution operations to generate identically-sized output tensors for each branch, thereby eliminating the need for post-processing of the branches' output tensors prior to combining them.

20 Claims, 7 Drawing Sheets

(51) Int. Cl.

| | |
|---|---|
| ***G06N 3/084*** | (2023.01) |
| ***G06N 3/10*** | (2006.01) |
| *G06N 3/048* | (2023.01) |

(56) References Cited

U.S. PATENT DOCUMENTS

| | | | | |
|---|---|---|---|---|
| 2021/0158132 | A1* | 5/2021 | Huynh | G06N 3/04 |
| 2021/0326597 | A1* | 10/2021 | Yi | G06F 18/214 |

FOREIGN PATENT DOCUMENTS

| | | | |
|---|---|---|---|
| CN | 112395547 | A | 2/2021 |
| CN | 113449859 | A | 9/2021 |
| WO | 2020061152 | A1 | 3/2020 |

OTHER PUBLICATIONS

He, Kaiming et al.; "Deep Residual Learning for Image Recognition"; Dec. 2015; arXiv; 1-12 (Year: 2015).*

Shao, Jing et al; "Slicing Convolutional Neural Network for Crowd Video Understanding"; 2016; IEEE; 2016 IEEE Conference on Computer Vision and Pattern Recognition; 5620-5628 (Year: 2016).*

Liu, Kun; "T-C3D: Temporal Convolutional 3D Network for Real-Time Action Recognition"; 2018; AAAI-18; 7138-7145 (Year: 2018).*

Zhang, Zhaoyu et al. "A Cross-Layer Based Network for Faster Image Generation"; 2018; IEEE; ICIP 2018; 3903-3907 (Year: 2018).*

Hyunh-The, Thien et al.; "Learning 3D spatiotemporal gait feature by convolutional network for person identification"; Feb. 2020; Elsevier; Neurocomputing 397 (2020)I 192-202 (Year: 2020).*

Transcript and Screen Captures from YouTube video clip entitled "Convolutional Neural Networks Explained (CNN Visualized)"; 26 pages; uploaded on Dec. 19, 2020 by user "Futurology—An Optimistic Future"; Retrieved from internet <https://www.youtube.com/watch?v=pj9-rr1wDhM> (Year: 2020).*

"6.3 Padding and Stride" in Dive into Deep Learning; [online]; Aug. 2021; [retrieved Dec. 3, 2024]; Retrieved from internet <URL: https://web.archive.org/web/20210817220416/https://d2l.ai/chapter_convolutional-neural-networks/padding-and-strides.html> (Year: 2021).*

Yang, Jiancheng et al.; "Reinventing 2D Convolutions for 3D Images"; Jan. 2021; arXiv; 1-12 (Year: 2021).*

Hajimolahoseini, Habib et al.; "Is 3D Convolution with 5D Tensors Really Necessary for Video Analysis?"; Jul. 2024; arXiv; 1-6 (Year: 2024).*

Tran, Du, et al. "A closer look at spatiotemporal convolutions for action recognition." Proceedings of the IEEE conference on Computer Vision and Pattern Recognition. 2018.

Qiu, Zhaofan, Ting Yao, and Tao Mei. "Learning spatio-temporal representation with pseudo-3d residual networks." proceedings of the IEEE International Conference on Computer Vision. 2017.

Xie, Saining, et al. "Rethinking spatiotemporal feature learning for video understanding." arXiv preprint arXiv:1712.04851 1.2 (2017): 5.

Zolfaghari, Mohammadreza, Kamaljeet Singh, and Thomas Brox. "Eco: Efficient convolutional network for online video understanding." Proceedings of the European conference on computer vision (ECCV). 2018.

Kim, Hyein, et al. "Rank-1 convolutional neural network." arXiv preprint arXiv:1808.04303 (2018).

* cited by examiner

...

2D convolution block 300

Output tensor 129 [B,T,X*Y,S]

Fully connected block 602

Pooling layer 604

...

Channel tensor 606 [B,S]

Fully connected layer 608

Prediction information 139

METHODS, SYSTEMS, AND MEDIA FOR COMPUTER VISION USING 2D CONVOLUTION OF 4D VIDEO DATA TENSORS

RELATED APPLICATION DATA

This is the first patent application related to this matter.

FIELD

The present disclosure relates to artificial neural networks, including convolutional neural networks used to perform computer vision tasks based on multi-frame video data.

BACKGROUND

Artificial neural networks are computational structures used to create and apply models for performing inference tasks. A neural network typically includes multiple layers of neurons, each neuron receiving inputs from a previous layer, applying a set of weights to the inputs, and combining these weighted inputs to generate an output, which is in turn provided as input to one or more neurons of a subsequent layer.

A layer of neurons uses filters to define the relationship between the outputs of the neurons of the previous layer and the outputs of the neurons of the current layer. A layer of the neural network receives a data input, usually in the form of a data array of known dimensions, typically called a tensor. A tensor is a mathematical object analogous to, but more general than, a vector, represented by an array of components that are functions of the coordinates of a space. Thus, a tensor may be a one-dimensional array encompassing a set of elements positioned along a single dimension, a 2D matrix encompassing a set of elements having positions defined by two dimensions, a 3D structure encompassing a set of elements having positions defined by three dimensions, and so on.

In the case of neural networks operating on 3D data such as image data (defined by two spatial dimensions, horizontal pixel position X and vertical pixel position Y, and a third channel dimension C, for example red/green/blue color channels), an input layer of the neural network receives the 3D image data as a 3D input tensor, and each subsequent layer in the neural network generally receives data input as a 3D tensor consisting of a set of multiple 2D input activation maps (also called input feature maps or input channels). By applying the set of filters to the set of input activation maps, the layer generates a data output, which is typically an output tensor having known dimensions: again, in the case of neural networks operating on 3D data (such as multi-channel image data), the output tensor of a layer of the network is generally a 3D tensor consisting of a set of multiple 2D output activation maps (also called output feature maps or output channels). Each output activation map includes the spatial dimensions X and Y, and the multiple 2D output activation maps are arranged along an output channel dimension S. In some implementations, the spatial dimensions of the output activation maps may have the same size (i.e. the same number of elements arranged along the dimension) as the spatial dimensions of the input tensor; in other implementations, the output activation maps may be resized by the convolution operation to have different spatial dimension from those of the input tensor. The size of the output channel dimension S is equal to the number of filters in the layer.

A filter comprises a set of weights (also called learnable parameters, or simply parameters). In some neural networks, such as convolutional neural networks (CNNs), the weights of a filter are arranged into convolution kernels, such as 2D convolution kernels, which are used to perform 2D convolution on a set of 2D input activation maps (i.e. a 3D input tensor). In the context of image processing, each kernel of a filter corresponds to a channel of the input tensor (i.e. a single 2D input activation map). The application of a single filter to the input tensor (e.g. by convolving the kernels of the filter with the corresponding input activation maps of the data input) generates a single 2D output activation map. The set of 2D output activation maps generated by the set of filters of the convolution layer are the data output of the convolution layer (i.e., the 3D output tensor).

Thus, in the context of 2D convolution performed on 3D input tensors, a filter is a 3D array of weights arranged into multiple 2D kernels.

Some neural networks are configured and trained to process video data (i.e. multiple frames of video, each frame consisting of multi-channel image data corresponding to a distinct point in time). Video-processing neural networks may be trained to perform computer vision tasks such as recognizing an activity being performed by a person in a video, improving video quality, and so on. Video-processing neural networks tend to operate on tensors having more than three dimensions. Some are configured to process a single video data sample (i.e. a video clip) at a time, the video data sample being represented as a 4D input tensor defined by the dimensions of horizontal position, vertical position, channels, and frames. Thus, a single frame corresponds to a 3D tensor of image data as described above, and the video data sample includes multiple such 3D frames arranged along a fourth dimension corresponding to a plurality of frames corresponding to different points in time. The frame dimension of a video data sample may thus be regarded as a temporal dimension T.

Many contemporary video-processing neural networks operate upon batches of multiple video clips (i.e. multiple video data samples) at a time, thereby resulting in 5D input tensors. Each 5D input tensor to such a neural network includes multiple 4D video data tensors as described above, arranged along a fifth dimension corresponding to an index value for each distinct video data sample within a batch of video data being processed. This dimension may be referred to as a batch index dimension B.

Many video-specific computer vision tasks require analysis of the video data along its temporal dimension. For example, processing a video data sample to recognize a hand gesture being performed by a user's hand over time requires that multiple frames of the video data sample be processed together, rather than in isolation. Accordingly, existing video-processing CNNs typically perform 3D convolution operations on 5D input tensors, in order to convolve 3D kernels over the two spatial dimensions as well as the temporal dimension of the video data sample. 3D convolution uses 4D filters, each 4D filter including multiple 3D kernels, to traverse (i.e. convolve) a 4D (or 5D) input tensor over three of its dimensions (as opposed to convolving the input tensor with the filter over two dimensions as in 2D convolution). Typically, 3D convolution of a 5D video data tensor having dimensions [B, T, X, Y, C] applies a 3D kernel of size (t, d, d) to traverse the $2^{nd}$, $3^{rd}$, and $4^{th}$ dimensions of the 5D input tensor, i.e. the temporal dimension and the two spatial dimensions. 3D convolution is typically much more computationally expensive than 2D convolution: the much larger number of weights included in 3D kernels relative to 2D kernels results in a much larger neural network, greatly increasing memory demand, and 3D convolution operations are much more computationally expensive than comparable 2D convolution operations, thereby placing greater demands on processors. The greater memory and processor requirements of 3D convolution video-processing CNNs make many real-time computer vision tasks infeasible for execution on edge devices such as mobile phones; in some cases, the hardware used in edge devices does not even support 3D convolution of 4D or 5D tensors, rendering the tasks impossible even if the computational resource limitation were overcome.

There therefore exists a need for video-processing CNN techniques that address one or more of the limitations of the existing approaches described above.

SUMMARY

In various examples, the present disclosure describes methods, systems, and computer-readable media for computer vision using 2D convolution of 4D video data tensors.

Various approaches have attempted to address the limitations of video-processing CNNs using 3D convolution described above. These approaches include cascaded methods, parallel methods, mixed methods, and rank-1 methods.

Cascaded Methods, such as R(2+1)D, S3D, and P3D-A, split each 3D convolution operation into consecutive spatial and temporal 3D convolution operations by using 3D kernels with a size of 1 in one of the dimensions. One such approach is described by Tran, Du, et al. "A closer look at spatiotemporal convolutions for action recognition." Proceedings of the IEEE conference on Computer Vision and Pattern Recognition. 2018. This approach uses a cascaded method that first applies spatial processing (using kernels with size 1 in the temporal dimension) and then temporal processing (using kernels with size 1 in a spatial dimension). This approach still applies 3D convolution operations to 5D input tensors (i.e., a 5D tensor is traversed in three dimensions by each 4D filter) in their implementation. Cascaded approaches generally require a substantial amount of processing time, as the spatial processing must be completed before providing the result to the temporal processing stage.

Parallel Methods, such as P3D-B, apply parallel streams of spatial and temporal analysis. One such approach is described by Qiu, Zhaofan, Ting Yao, and Tao Mei. "Learning spatio-temporal representation with pseudo-3d residual networks." proceedings of the IEEE International Conference on Computer Vision. 2017. This approach introduces different combinations of spatial and temporal processing, which are implemented as 3D convolution operations performed on 5D input tensors. Extra processing is also performed to make the output of each parallel branch (i.e. a spatial analysis branch and a temporal analysis branch) have the same shape, which adds to the processing time. Accordingly, even though parallel implementations could theoretically be faster than cascaded approaches, in practice parallel approaches tend to be even slower than cascaded approaches.

Mixed Methods, such as P3D-C, use a mixture of parallel and serial streams of spatial and temporal analysis. One such approach is described by Xie, Saining, et al. "Rethinking spatiotemporal feature learning for video understanding." arXiv preprint arXiv:1712.04851 1.2 (2017): 5. They still use Conv3D with 5D tensors in their implementation. This paper studies whether it is better to focus on spatial analysis at the earlier layers of a CNN and temporal analysis at the last layers, or vice versa. Another such approach is described by Zolfaghari, Mohammadreza, Kamaljeet Singh, and Thomas Brox. "Eco: Efficient convolutional network for online video understanding." Proceedings of the European conference on computer vision (ECCV). 2018. This paper addresses a similar question to the Xie reference above, studying the effectiveness of performing spatial processing at the beginning layers of a CNN and 3D convolution at the last layers. The 3D convolution operations in the approach proposed by the Zolfaghari reference are not split into spatial and temporal analysis; rather, any gains in efficiency are generally the result of limiting the number of layers performing 3D convolution.

Rank-1 Methods decompose each 3D kernel used in 3d convolution into three rank-1 vectors, which are used for horizontal position, vertical position, and temporal processing respectively. One such approach is described by Kim, Hyein, et al. "Rank-1 convolutional neural network." arXiv preprint arXiv:1808.04303 (2018). These approaches are a different way of decomposing the 3D convolution layers into 3 cascaded layers for performing convolution to analyze the X, Y, and T dimensions. The filters are decomposed using a tensor decomposition technique and the three decomposed layers use rank-1 filters. This approach relies on a strong mathematical assumption, namely that each 3D convolution filter can be represented as three rank-1 vectors, which may not be valid in practice. In cases where this assumption is invalid, this approach can potentially result in a significant loss in accuracy.

Thus, each existing approach to simplifying 3D convolution of 5D input tensors in video-processing CNNs continues to rely on 3D convolution operations in at least some layers of the CNN, thereby exhibiting at least some of the same shortcomings as conventional 3D CNNs, and sometimes introducing other shortcomings as well. Furthermore, although some existing approaches use parallel paths for spatial and temporal processing with the goal of improving efficiency, such parallel approaches often suffer from efficiency losses because the output tensors of the parallel spatial and temporal branches may not have the same dimensions. For example, the output tensor of a spatial branch may be a 5D tensor of size [8, 16, 128, 128, 64] in each of the five dimensions, but the output tensor of the temporal branch may have a different size of [8, 8, 256, 256, 64]. In order to combine these two output tensors, their sizes in each dimension must match. Therefore, more post-processing is needed before combining them by addition or concatenation.

The present disclosure describes methods, systems, and computer-readable media that may address one or more limitations of conventional 3D convolution techniques and may also address one or more of the limitations of cascaded, parallel, mixed, and rank-1 methods used to overcome the limitations of conventional techniques. In described embodiments, various types of 3D convolution operations performed on 5D input tensors in existing approaches (e.g., spatial analysis and temporal analysis) are simulated by performing 2D convolution of 4D tensors instead. In some embodiments, a convolution block of a CNN performs two parallel operations: a spatial processing branch performs spatial feature extraction on a 4D tensor using 2D convolution, whereas a temporal processing branch performs temporal feature extraction on a different 4D tensor using 2D convolution. The output tensors of the spatial processing branch and the temporal processing branch are combined to generate an output tensor of the convolution block, which may be processed by further convolution blocks of the CNN or may be post-processed to generate a logits output of the CNN. In some embodiments, the spatial processing branch and/or the temporal processing branch may include additional operations such as reshaping and/or further convolution operations to generate identically-sized output tensors for each branch, thereby eliminating the need for post-processing of the branches' output tensors prior to combining them.

Example embodiments described herein may exhibit one or more advantages over the existing approaches described above. Using 2D convolution and 4D tensors may enable execution of described examples on a variety of edge devices that do not support 3D convolution operations with 5D tensors. Example parallel structures described herein, for parallel spatial and temporal processing (e.g. spatial and temporal feature extraction), assisted by appropriate reshaping of tensors and down-sampling using appropriate values for convolution stride used in each branch (e.g. a spatial processing branch and a temporal processing branch) may allow examples described herein to be implemented more efficiently than existing approaches without a loss of accuracy. Furthermore, splitting the 3D kernels into smaller 2D kernels may significantly reduce the number of parameters of the example CNNs described herein relative to existing approaches, potentially leading to greater memory efficiency.

The methods described herein may be used in computer vision tasks such as classifying behavior or people or objects visible in a video clip or improving the video quality of video frames of a video clip, which may be applied to fields such as autonomous driving, intelligent transportation systems, violence detection, and flaw detection in high-speed production lines. The methods may enable the deployment of trained convolutional neural networks on computationally-limited devices such as cellphones, embedded devices, robotics, drones, cameras, Internet of Thing (IoT) sensors, and IoT devices.

In some aspects, the present disclosure describes a method for processing an input tensor to generate an output tensor. The method includes a number of steps. The input tensor is obtained. The input tensor comprises a five-dimensional (5D) tensor having a batch index dimension indicating individual video data samples in a batch of video data samples, a temporal dimension, a first spatial dimension, a second spatial dimension, and an input channel dimension. A four-dimensional (4D) spatial input tensor is generated based on the input tensor by combining the batch index dimension and temporal dimension of the input tensor into a combined batch index-temporal dimension. Two-dimensional (2D) convolution is performed on the 4D spatial input tensor to generate a 4D spatial feature tensor. A 4D temporal input tensor is generated, based on the input tensor, having a combined spatial dimension based on the first spatial dimension and second spatial dimension of the input tensor. 2D convolution is performed on the 4D temporal input tensor to generate a 4D temporal feature tensor. The 4D spatial feature tensor and the 4D temporal feature tensor are processed to generate the output tensor.

In some aspects, the present disclosure describes a system for processing an input tensor to generate an output tensor. The system comprises a processor device, and a memory storing machine-executable instructions which, when executed by the processor device, cause the system to perform a number of steps. The input tensor is obtained. The input tensor comprises a five-dimensional (5D) tensor having a batch index dimension indicating individual video data samples in a batch of video data samples, a temporal dimension, a first spatial dimension, a second spatial dimension, and an input channel dimension. A four-dimensional (4D) spatial input tensor is generated based on the input tensor by combining the batch index dimension and temporal dimension of the input tensor into a combined batch index-temporal dimension. Two-dimensional (2D) convolution is performed on the 4D spatial input tensor to generate a 4D spatial feature tensor. A 4D temporal input tensor is generated, based on the input tensor, having a combined spatial dimension based on the first spatial dimension and second spatial dimension of the input tensor. 2D convolution is performed on the 4D temporal input tensor to generate a 4D temporal feature tensor. The 4D spatial feature tensor and the 4D temporal feature tensor are processed to generate the output tensor.

Using 2D convolution and 4D tensors may enable execution of described examples on a variety of edge devices that do not support 3D convolution operations with 5D tensors. Splitting the 3D kernels into smaller 2D kernels may significantly reduce the number of parameters of the example CNNs described herein relative to existing approaches, potentially leading to greater memory efficiency.

In some examples, combining the batch index dimension and temporal dimension of the input tensor comprises concatenating a plurality of three-dimensional (3D) tensors defined by the first spatial dimension, second spatial dimension, and input channel dimension to form the four-dimensional spatial input tensor. The combined batch index-temporal dimension has a size equal to the size of the batch index dimension of the input tensor multiplied by the size of the temporal dimension of the input tensor.

In some examples, generating the 4D temporal input tensor comprises concatenating a plurality of 3D tensors defined by the batch index dimension, temporal dimension, and input channel dimension of the input tensor to form the four-dimensional temporal input tensor. The combined spatial dimension has a size equal to the size of the first spatial dimension of the input tensor multiplied by the size of the second spatial dimension of the input tensor.

In some examples, performing 2D convolution on the 4D spatial input tensor to generate the 4D spatial feature tensor comprises applying a first number of 2D convolution filters to the 4D spatial input tensor, at a stride equal to a second number with respect to the first spatial dimension and the second spatial dimension, to generate the 4D spatial feature tensor having a combined batch index-temporal output dimension, a first spatial output dimension having a size equal to the first spatial dimension of the input tensor divided by the second number, a second spatial output dimension having a size equal to the second spatial dimension of the input tensor divided by the second number, and an output channel dimension indicating a number of spatial feature maps equal to the first number.

In some examples, performing 2D convolution on the 4D temporal input tensor to generate the 4D temporal feature tensor comprises applying a third number of 2D convolution filters to the 4D temporal input tensor, at a stride equal to a fourth number with respect to the temporal dimension, and a stride equal to the square of the second number with respect to the combined spatial dimension, to generate the 4D temporal feature tensor having a batch index output dimension, a temporal dimension having a size equal to the temporal dimension of the input tensor divided by the fourth number, a combined spatial output dimension having a size equal to the first spatial dimension of the input tensor divided by the second number and multiplied by the second spatial dimension of the input tensor divided by the second number, and an output channel dimension indicating a number of temporal feature maps equal to the third number.

In some examples, processing the 4D spatial feature tensor and the 4D temporal feature tensor to generate the output tensor comprises reshaping the 4D spatial feature tensor to generate a reshaped 4D spatial feature tensor, having a batch index dimension having a size equal to the size of the batch index dimension of the input tensor, a temporal dimension having a size equal to the size of the temporal dimension of the input tensor, a combined spatial output dimension having a size equal to the first spatial dimension of the input tensor divided by the second number multiplied by the second spatial dimension of the input tensor divided by the second number, and an output channel dimension indicating a number of spatial feature maps equal to the first number. The reshaped 4D spatial feature tensor and the 4D temporal feature tensor are processed to generate the output tensor.

In some examples, processing the reshaped 4D spatial feature tensor and the 4D temporal feature tensor to generate the output tensor comprises applying a number of single-element convolution filters equal to the first number to the reshaped 4D spatial feature tensor, at a temporal dimension stride equal to the fourth number with respect to the temporal dimension, to generate a temporally down-sampled 4D spatial feature tensor. The temporally down-sampled 4D spatial feature tensor and the 4D temporal feature tensor are processed to generate the output tensor.

In some examples, processing the temporally down-sampled 4D spatial feature tensor and the 4D temporal feature tensor to generate the output tensor comprises adding the elements of the temporally down-sampled 4D spatial feature tensor to the respective elements of the 4D temporal feature tensor to generate the output tensor.

By using parallel spatial and temporal processing, assisted by appropriate reshaping of tensors and down-sampling using appropriate values for convolution stride used in the spatial processing branch and the temporal processing branch, may allow examples described herein to be implemented more efficiently than existing approaches without a loss of accuracy.

In some examples, combining the batch index dimension and temporal dimension of the input tensor comprises concatenating a plurality of three-dimensional (3D) tensors defined by the first spatial dimension, second spatial dimension, and input channel dimension to form the four-dimensional spatial input tensor. The combined batch index-temporal dimension has a size equal to the size of the batch index dimension of the input tensor multiplied by the size of the temporal dimension of the input tensor. Generating the 4D temporal input tensor comprises concatenating a plurality of 3D tensors defined by the batch index dimension, temporal dimension, and input channel dimension of the input tensor to form the four-dimensional temporal input tensor. The combined spatial dimension has a size equal to the size of the first spatial dimension of the input tensor multiplied by the size of the second spatial dimension of the input tensor. Performing 2D convolution on the 4D spatial input tensor to generate the 4D spatial feature tensor comprises applying a first number of 2D convolution filters to the 4D spatial input tensor, at a stride equal to a second number with respect to the first spatial dimension and the second spatial dimension, to generate the 4D spatial feature tensor having a combined batch index-temporal output dimension, a first spatial output dimension having a size equal to the first spatial dimension of the input tensor divided by the second number, a second spatial output dimension having a size equal to the second spatial dimension of the input tensor divided by the second number, and an output channel dimension indicating a number of spatial feature maps equal to the first number. Performing 2D convolution on the 4D temporal input tensor to generate the 4D temporal feature tensor comprises applying a third number of 2D convolution filters to the 4D temporal input tensor, at a stride equal to a fourth number with respect to the temporal dimension, and a stride equal to the square of the fourth number with respect to the combined spatial dimension, to generate the 4D temporal feature tensor having a batch index output dimension, a temporal dimension having a size equal to the temporal dimension of the input tensor divided by the fourth number, a combined spatial output dimension having a size equal to the first spatial dimension of the input tensor divided by the fourth number multiplied by the second spatial dimension of the input tensor divided by the fourth number, and an output channel dimension indicating a number of temporal feature maps equal to the third number. Processing the 4D spatial feature tensor and the 4D temporal feature tensor to generate the output tensor comprises reshaping the 4D spatial feature tensor to generate a reshaped 4D spatial feature tensor, having a batch index dimension having a size equal to the size of the batch index dimension of the input tensor, a temporal dimension having a size equal to the size of the temporal dimension of the input tensor, a combined spatial output dimension having a size equal to the first spatial dimension of the input tensor divided by the second number multiplied by the second spatial dimension of the input tensor divided by the second number, and an output channel dimension indicating a number of spatial feature maps equal to the first number. A number of single-element convolution filters equal to the first number are applied to the reshaped 4D spatial feature tensor, at a temporal dimension stride equal to the fourth number with respect to the temporal dimension, to generate a temporally down-sampled 4D spatial feature tensor. The elements of the temporally down-sampled 4D spatial feature tensor are added to the respective elements of the 4D temporal feature tensor to generate the output tensor. The first number is equal to the third number.

In some aspects, the present disclosure describes a non-transitory processor-readable medium having stored thereon an output tensor generated according to one or more of the methods described above.

In some aspects, the present disclosure describes a non-transitory processor-readable medium having stored thereon machine-executable instructions which, when executed by a processor of a device, cause the device to perform the steps of one or more of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
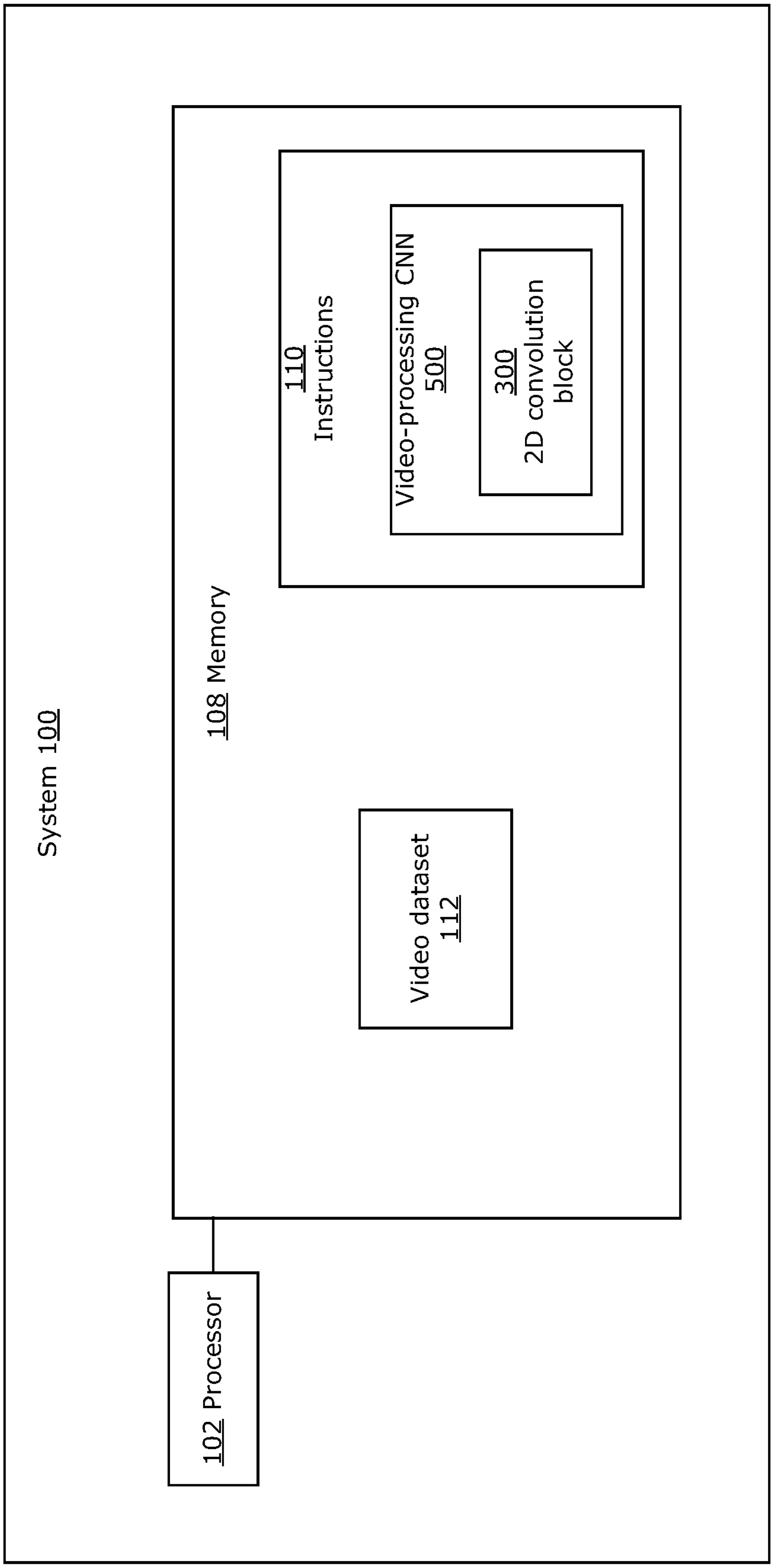
FIG. 1 is a block diagram of an example computing system that may be used to implement examples described herein.

Methods, systems, and computer-readable media for computer vision using 2D convolution of 4D video data tensors, will now be described with reference to example embodiments. Example embodiments will be described herein with reference to deep convolutional neural networks (CNNs) that are trained using supervised learning for a particular computer vision task and, after being trained, the trained CNN is used to perform the particular computer vision task such as behavior classification (i.e., classification of behavior of a human visible within the frames of a video clip) using batches of video data samples as inputs. However, it will be appreciated that the techniques described herein are potentially applicable to the training of a variety of convolutional neural networks to perform a variety of inference tasks using supervised or unsupervised learning.

A CNN trained in accordance with examples disclosed herein may in some examples be implemented within a larger deep neural network. For simplicity, the present disclosure will refer to the CNN by itself, however it should be understood that the CNN may be part of a larger deep network, and training of the CNN may be part of training of the overall larger network architecture. Further, the present disclosure may use the term CNN to include a deep CNN.

In deep CNNs, most of the computation time is spent on convolutional layers. In a convolutional layer, filters are convolved over inputs of the layer to generate outputs. In the examples described herein, the input of each convolutional layer may be a 4D tensor of values representing features, organized into four dimensions. In 2D convolution layers, as described herein, one or more 4D filters are used to perform respective 2D convolution operations on the input tensor to generate a 4D output tensor. Each filter includes a 2D convolution kernel (i.e. a 2D matrix of weight values) extended across two additional dimensions, by using multiple distinct kernels with distinct sets of weights across the two additional dimensions. Thus, for example, a convolution layer may use a filter consisting of five 3-by-3 kernels to perform 2D convolution on a 4D input tensor with dimensions [T, X, Y, C], wherein the size of the 4D input tensor is [T=30, X=100, Y=100, C=3]. Each 3-by-3 kernel of each filter may be defined as a 2D matrix of nine weight values in the X-Y plane, e.g., [1 0 1; 0 1 1; 1 1 0]. Each kernel of a filter uses its own distinct set of nine weights that are tuned (i.e. adjusted) during training. The 2D convolution operation for a given filter is performed by convolving or traversing each kernel across the X and Y values of each X-Y activation map defined by a constant [T, C] vector value (i.e., an activation map of size [100,100]). The 2D convolution operation of a set of 3 kernels with respect to a set of three 2D activation maps extending across the channel dimension C and defined by a constant T value generates a single 2D output activation map; the size of the output activation map may be [100,100] or a different value depending on the stride, padding, and other hyperparameters of the 2D convolution operation. Thus, the convolution of a single 4D filter with the 4D input tensor generates a 3D output having two spatial dimensions and a temporal dimension (e.g., 30 activation maps of size [100,100], yielding a 3D output tensor of size [T=30, X=100, Y=100]). The set of five 4D filters thus generates a 4D output tensor for the convolution layer, e.g. a 4D output tensor of size [T=30, X=100, Y=100, S=5] wherein S is the output channel dimension.

A computing system that may be used in examples disclosed herein is first described.

FIG. 1 is a block diagram of a computing system 100 (hereinafter referred to as system 100) for computer vision using 2D convolution of 4D video data tensors. Although an example embodiment of the system 100 is shown and discussed below, other embodiments may be used to implement examples disclosed herein, which may include components different from those shown. Although FIG. 1 shows a single instance of each component of the system 100, there may be multiple instances of each component shown.

The system 100 includes one or more processors 102, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 102 may collectively be referred to as a "processor device" or "processor 102".

The system 100 includes one or more memories 108 (collectively referred to as "memory 108"), which may include a volatile or non-volatile memory (e.g., a flash memory, a random access memory (RAM), and/or a read-only memory (ROM)). The non-transitory memory 108 may store machine-executable instructions for execution by the processor 102, such as to carry out examples described in the present disclosure. A set of machine-executable instructions 110 defining a 2D convolution block 300 as part of a video-processing CNN 500 are shown stored in the memory 108, which may each be executed by the processor 102 to perform the steps of the methods described herein. The operation of the system 100 in executing the set of machine-executable instructions 110 defining the 2D convolution block 300 and video-processing CNN 500 is described below with reference to FIG. 3. The machine-executable instructions 110 defining the 2D convolution block 300 and video-processing CNN 500 are executable by the processor 102 to perform the functions of each respective component or submodule thereof shown in FIG. 3. The memory 108 may include other machine-executable instructions, such as for implementing an operating system and other applications or functions.

The memory 108 stores one or more datasets, such as a video dataset 112. In example embodiments described herein, the video dataset 112 comprises a plurality of video data samples. Each video data sample may be represented as a plurality of video frames, each video frame being an image (i.e. a multi-channel 2D array of pixels), as described above. A set of one or more video data samples, or portions thereof, may be referred to herein as "video data". Batches of video data samples (such as batch 121 described below) may be assembled out of the video dataset 112.

The memory 108 may also store other data, information, rules, policies, and machine-executable instructions described herein.

In some examples, the system 100 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 108 to implement data storage, retrieval, and caching functions of the system 100.

The components of the system 100 may communicate with each other via a bus, for example. In some embodiments, the system 100 is a distributed system such as a cloud computing platform and may include multiple computing devices in communication with each other over a network, as well as optionally one or more additional components. The various operations described herein may be performed by different devices of a distributed system in some embodiments.

Figure 2:
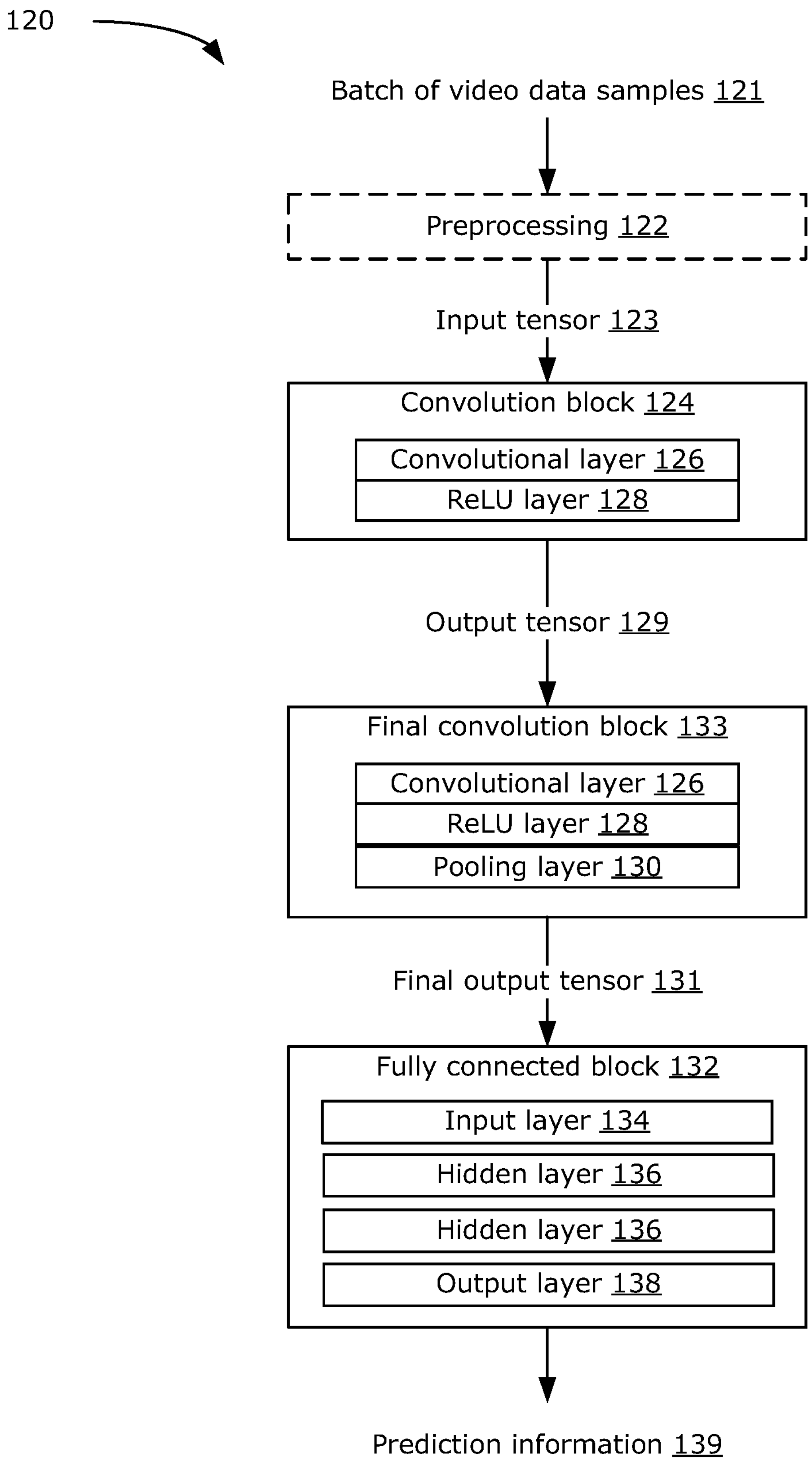
FIG. 2 is a schematic diagram of an example architecture for a CNN, showing an environment in which example embodiments may be implemented.

FIG. 2 illustrates an example architecture of a convolutional neural network (CNN) 120. The CNN 120 in this example is constructed and arranged for performing a specific task during training and inference, such as behavior classification and the like. The CNN 120 has been simplified, is not intended to be limiting and is provided for the purpose of illustration only. The input data to the CNN 120 may be, for example, video data representing a digital image, audio data representing an audio file, or text data (i.e. an embedding representing a word or a sentence). Optional elements are shown in dashed lines.

The CNN 120 includes one or more convolution blocks 124 configured, typically in sequence, to perform feature learning and feature extraction on the activation maps received from the previous block, and a fully connected block 132 configured to perform a particular computer vision task using the feature maps (i.e. activation maps) generated by the final convolution block 133 in the sequence (shown here as final output tensor 131 generated by final convolution block 133). The CNN 120 may also optionally include a preprocessing block 122, which may perform various operations, such as normalization, to prepare the input data for a convolutional block 124. In examples described herein, a preprocessing block 122 may operate to receive a batch of video data samples 121 including one or more video data samples, and shape the batch of video data samples 121 into a 5D input tensor 123 as described above (i.e., a tensor having dimensions [B, T, X, Y, C]). However, the CNN 120 shown in FIG. 2 is a generic structure intended to illustrate a general structure for a CNN configured to operate on input tensors of arbitrary dimensionality, size, and content.

Each convolution block 124, 133 shown in FIG. 2 may include, for example, a convolutional layer 126 and a combined non-linearity and rectification layer (e.g. ReLU layer 128). The final convolution block 133 also includes a pooling layer 130. The output from each layer in the convolution block 124, 133 is used as input to the next layer in the convolution block 124, 133. In other words, an output from a convolutional layer 126 may be used as an input to a following ReLU layer 128, and the output of the ReLU layer 128 may be used as an input to the pooling layer 130 of the final convolution block 133, or may be used as an input to a convolutional layer 126 of another convolutional block 124, 133 to continue a convolution operation. In examples described herein, the output tensor generated by the ReLU layer 128 is a 5D output tensor 129 as described above (i.e. a tensor having dimensions [B, T, X, Y, S]).

Because a quantity of parameters (e.g. weights) of filters of a convolutional layer 126 usually needs to be reduced, a pooling layer 130 may follow a convolutional layer 126 in a final convolutional block 130. In some embodiments, one or more non-final convolution blocks 124 may also include respective poolling layer 130. In a video-processing CNN, a purpose of the pooling layer 130 is to reduce a size of the output activation maps generated by ReLU layer 128. The pooling layer 130 may include an average pooling operator and/or a maximum pooling operator, to perform sampling on the input activation maps to obtain the output activation maps of a relatively small size. The average pooling operator may compute a pixel value in the activation map within a specific range, to generate an average value as an average pooling result. The maximum pooling operator may obtain, as a maximum pooling result, a pixel with a largest value within the specific range. The size of each activation map output after processing by the pooling layer may be smaller than a size of the activation maps input to the pooling layer. Each pixel in each activation map output by the pooling layer indicates an average value or a maximum value of a subarea corresponding to each activation map input to the pooling layer. In some embodiments, a reshaping operation may be performed before, after, or as part of the pooling layer 130 to reshape the output tensor of the convolution block 124, 133 into a tensor having a different size in one or more of its dimensions.

Thus, the input tensor 123 is processed by a convolution block 124 to generate output tensor 129, which is in turn processed by the final convolution block 133 as its respective input tensor in order to generate the final output tensor 131. However, the final output tensor 131 is not a usable output of the CNN 120, as it still represents feature maps or other activation maps that are not meaningful to human observers. To generate prediction information 139 legible to a human user (e.g., behavior classification information, etc.), a fully connected block 132 of the CNN 120 generates prediction information 139.

The fully connected block 132 includes an input layer 134, optionally one or more hidden layers 136, and an output layer 138. The output layer 138 follows the last hidden layer 136 of the fully connected block 132 (or, if no hidden layers 136 are used, it follows the input layer 134). In other words, the output layer 138 is a final layer in the entire CNN 120. During training of the CNN 120, training data and a supervised learning algorithm are used to train the CNN 120. After forward propagation (propagation in a direction from 124 to 138 in FIG. 2 is forward propagation) is complete a loss function similar to category (i.e. class) cross-entropy is used to compute a prediction error of the CNN 120, and back propagation (propagation in a direction from 138 to 124 in FIG. 2 is back propagation) is performed to update the parameters (e.g. weights) of the layers 128, 130, 132, 134, 136, and 128 of the CNN 120 based on the computed prediction error to reduce the prediction error between an ideal result (i.e. the ground truth in the training data) and the prediction result output by the output layer 138.

It should be noted that the CNN 120 shown in FIG. 2 is merely used as an example architecture of a convolutional neural network. In actual application, the architecture of the CNN 120 may exist in any of a number of forms.

The above discussion provides an example that illustrates how a trained CNN may be used for performing a specific task during inference. In general the input data may have one or more dimensions, and the prediction information 139 output may have any suitable format, depending on the prediction task that the CNN 120 is trained to perform. The example embodiments herein shall be described in the context of a CNN that is used to perform a particular task, such as behavior classification. FIGS. 3-6, described below, provide details of the structure of an example video-processing CNN and in particular a 2D convolution block included therein.

Figure 3:
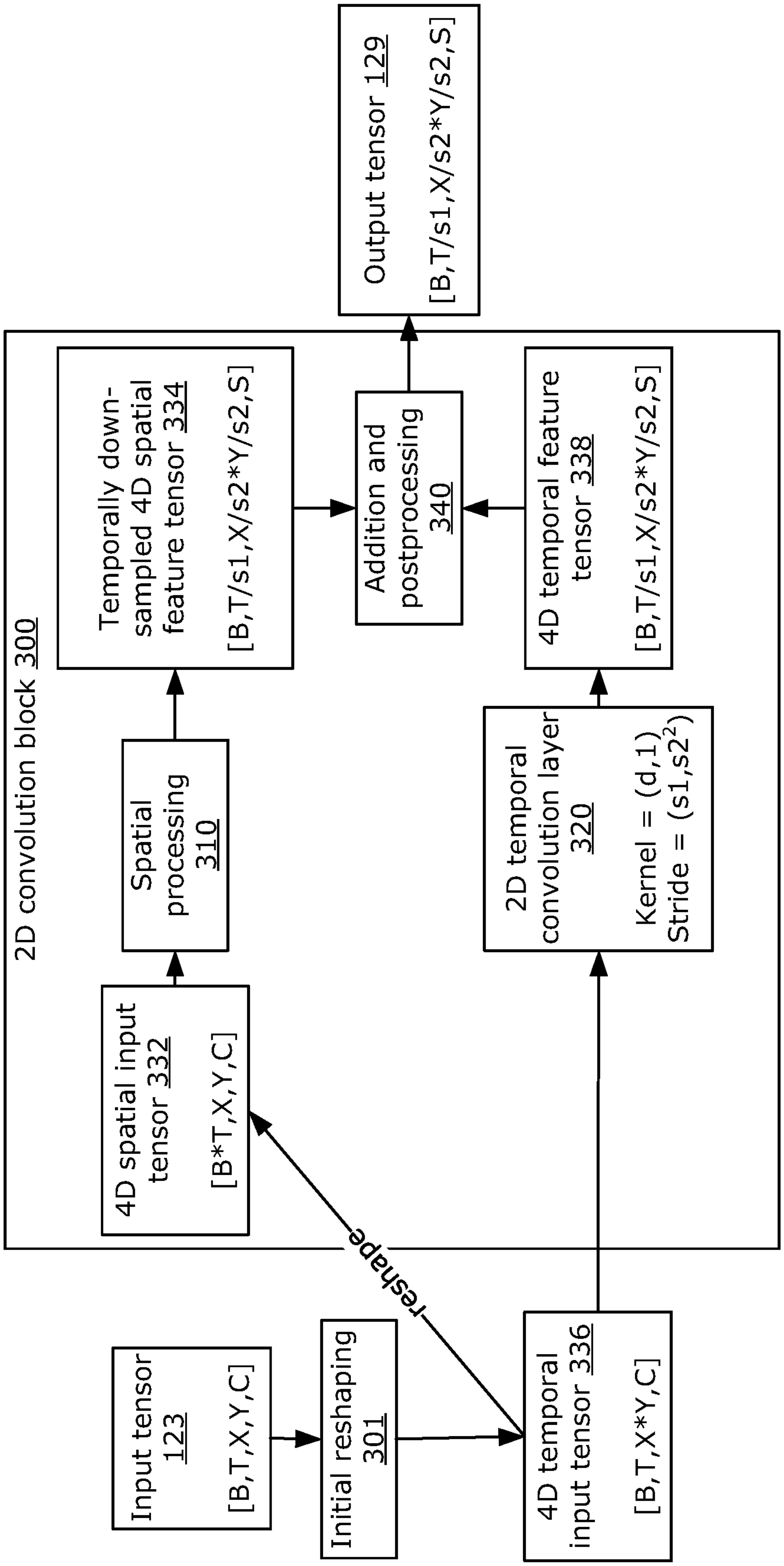
FIG. 3 is a schematic diagram of an example 2D convolution block according to example embodiments described herein.
Figure 5:
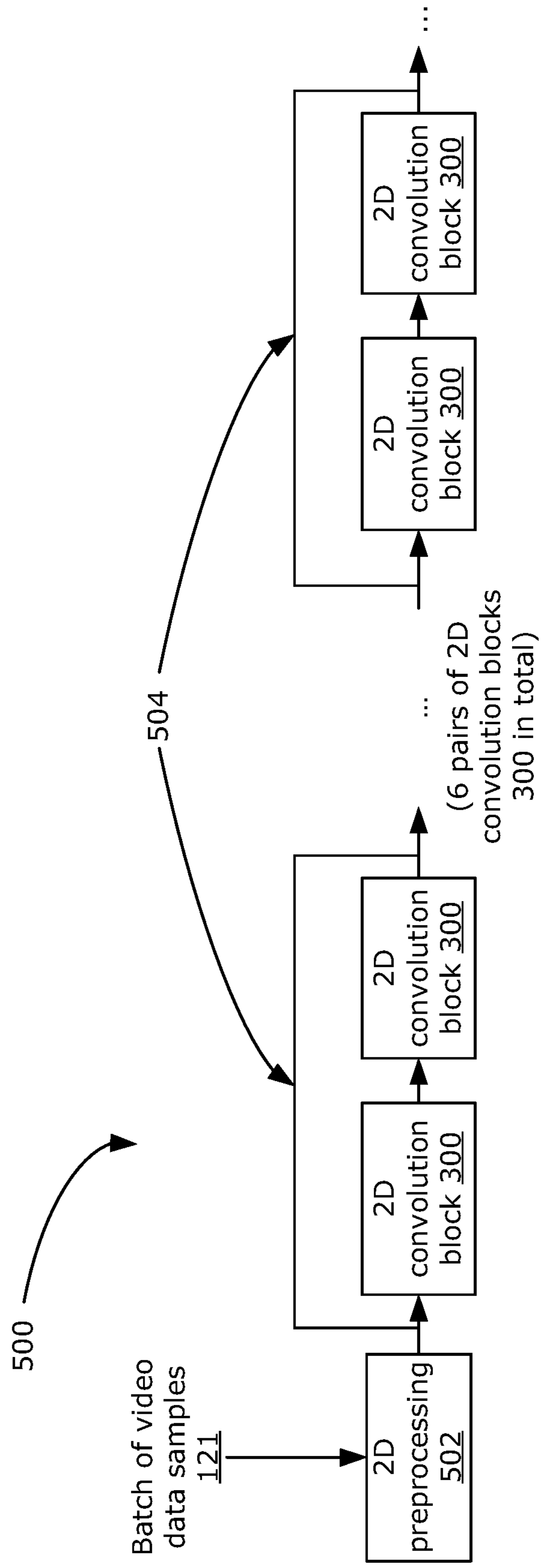
FIG. 5 is a schematic diagram of an example video-processing CNN incorporating the 2D convolution block of FIG. 3.
Figure 6:
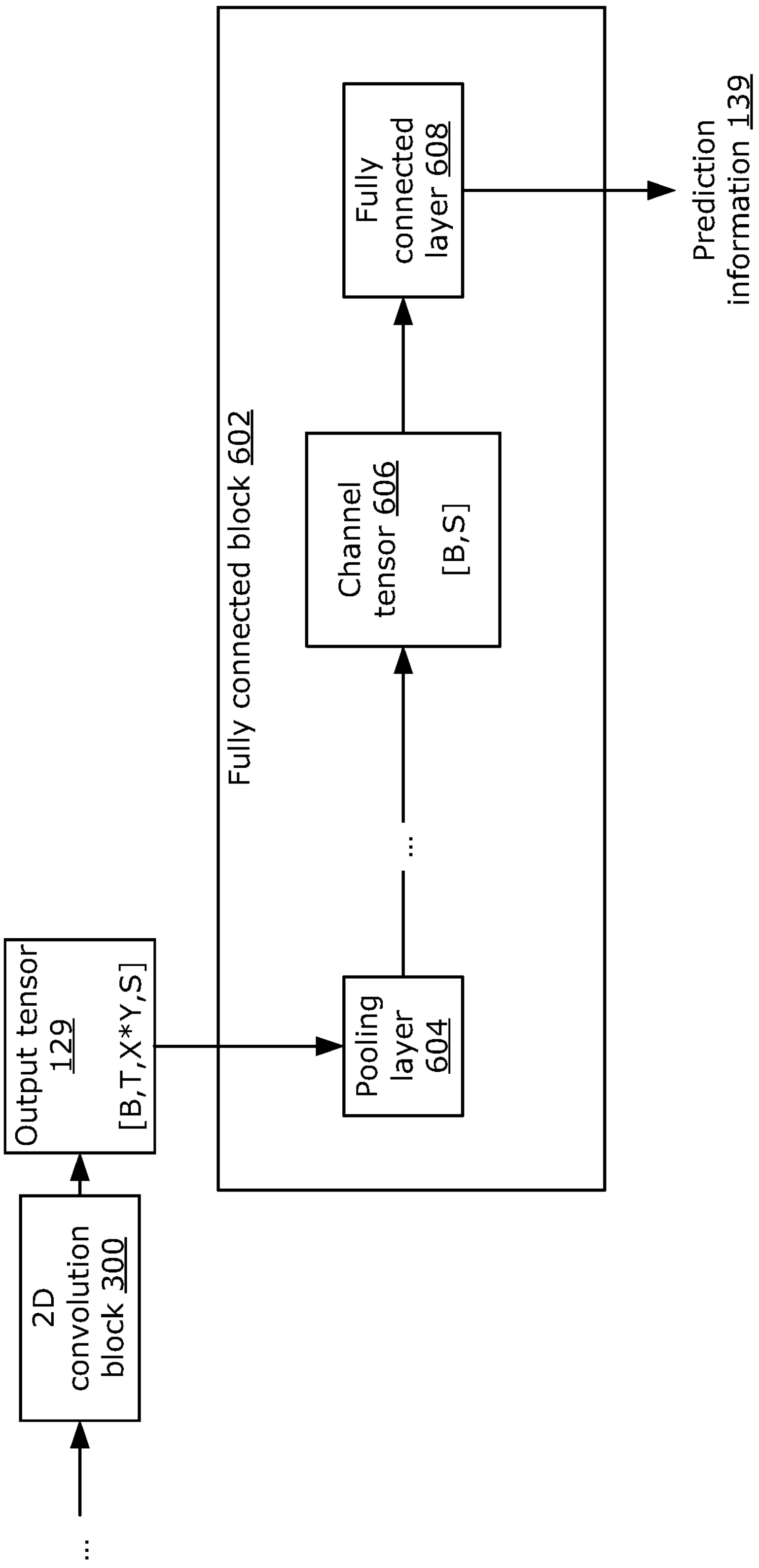
FIG. 6 is a schematic diagram showing the relationship between the 2D convolution block of FIG. 3 to an example fully connected layer of FIG. 2.

FIG. 3 illustrates a 2D convolutional block 300 that may be used as part of a video-processing CNN to perform 2D convolution on 4D tensors to simulate the performance of 3D convolution on 5D tensors as performed by a conventional 3D convolution block of a conventional video-processing CNN. The 2D convolution block 300 may generally perform the functions of convolution block 124 of FIG. 2 in the context of a CNN 120 trained to perform a computer vision task on video data, i.e. a video-processing CNN. However, in some embodiments the 2D convolution block 300 may also be used to perform the functions of the final convolution block 133 prior to the fully connected block 132 of FIG. 2, as shown in FIG. 6. An example structure for a video-processing CNN, incorporating multiple 2D convolution blocks 300, is shown in FIG. 5.

Figure 7:
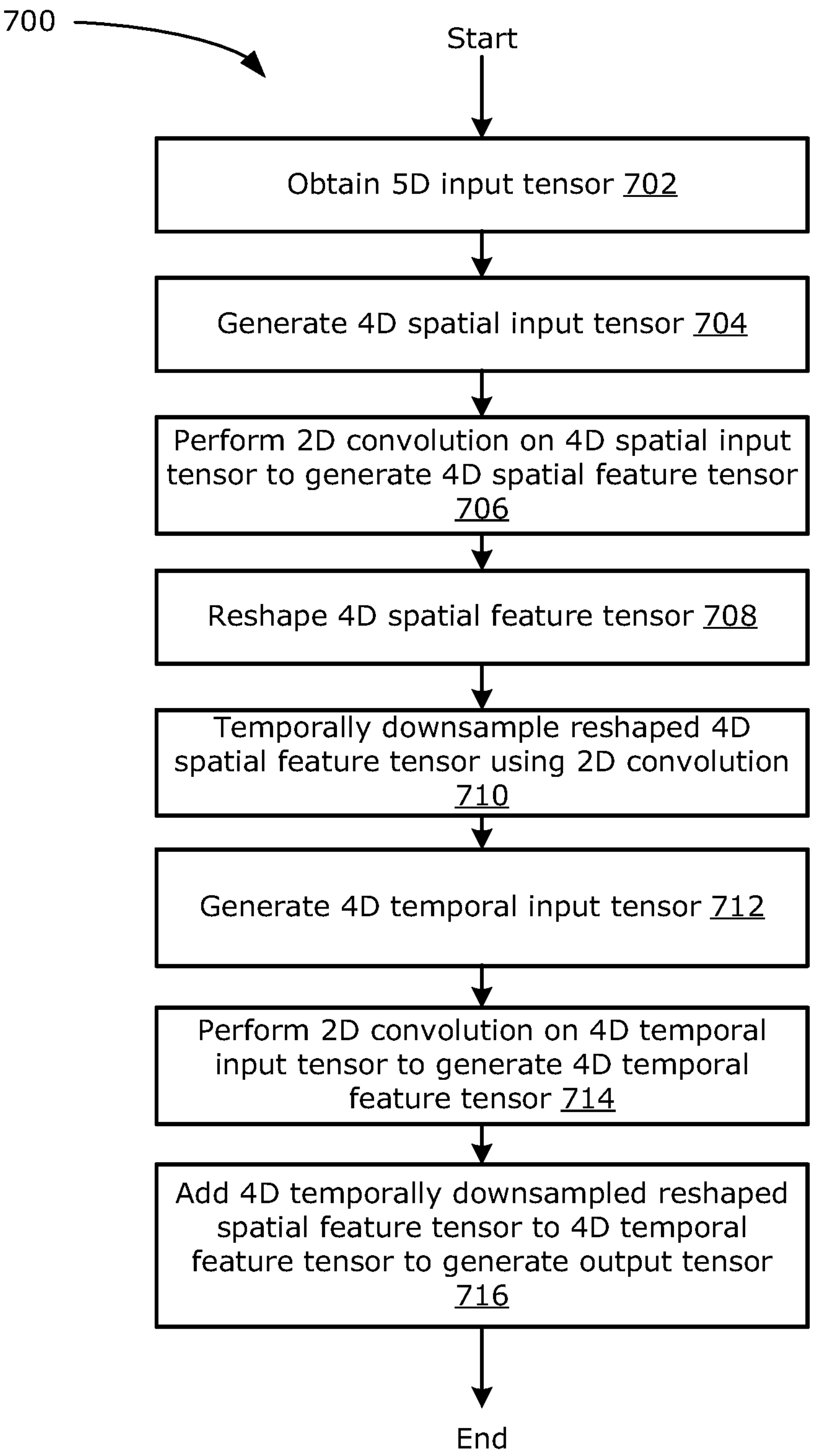
FIG. 7 is a flowchart illustrating an example method for processing an input tensor to generate an output tensor, in accordance with the present disclosure.

The flowchart of FIG. 7 shows steps of a method 700 for processing an input tensor to generate an output tensor, which will be described with reference to the operation of the 2D convolution block 300 of FIG. 3. Whereas the steps of method 700 are described with reference to the 2D convolution block 300 of FIG. 3, it will be appreciated that other structures may be used to perform one or more of the steps of method 700. For example, a preprocessing block 122 separate from the 2D convolution block 300 may be used to perform one or more initials steps of the method 700, and/or some steps of the method 700 may be performed by additional layers or sub-components not shown in FIG. 3, such as a pooling or reshaping layer.

Method 700 begins at step 702. At 702, an input tensor 123 is obtained. The input tensor 123, as shown in FIG. 3, is a 5D tensor of a video-processing CNN as described above, having dimensions [B, T, X, Y, C], i.e. a batch index dimension B indicating individual video data samples in a batch of video data samples, a temporal dimension T, a first spatial dimension X, a second spatial dimension Y, and an input channel dimension C. In some embodiments, the input tensor 123 is obtained by the 2D convolution block 300; in other embodiments, the input tensor 123 is obtained by a different component of a CNN, such as a preprocessing block 122, which preprocesses the input tensor 123 and provides preprocessed data to the 2D convolution block 300.

At 704, a 4D spatial input tensor 332 is generated based on the input tensor 123. In some embodiments, the 4D spatial input tensor 332 is generated by combining the batch index dimension B and temporal dimension T of the input tensor into a combined batch index-temporal dimension, denoted B*T in FIG. 3. The notation B*T indicates that the size of the combined batch index-temporal dimension is equal to the number of video clips (i.e. the size of batch index dimension B) multiplied by the number of frames in each video clip (i.e. temporal dimension T). The combined batch index-temporal dimension of the tensor may be arranged as a linear, sequential concatenation of each video clip in the batch of video clips; thus, if each video clip has 100 frames, then elements 0 through 99 of the combined batch index-temporal dimension correspond to a first video clip (B=0, T=0 through T=99), elements 100 through 199 of the combined batch index-temporal dimension correspond to a second video clip (B=1, T=0 through T=99), and so on. In some examples, the video clips may be combined in other ways, such as by interleaving their frames according to a predetermined pattern. It will be appreciated that, in later reshaping operations described below, the separation of the combined batch index-temporal dimension into two separate dimensions may be accomplished by reversing the operations used to combine the dimensions at step 704. It will also be appreciated that this reshaping may not be direct in some embodiments; for example, in the example 2D convolution block 300 shown in FIG. 3, the input tensor 123 is first reshaped by an initial reshaping operation 301 into a 4D temporal input tensor 336 having dimensions [B, T, X*Y, C], which is then reshaped within the 2D convolution block 300 to generate the 4D spatial input tensor 332.

In some embodiments, the reshaping operation of step 704 is performed by a structure of the CNN that is separate from the 2D convolution block 300, such as a preprocessing block 122. Whereas FIG. 3 shows the 2D convolution block 300 receiving the 5D input tensor 123 and generating a 4D output tensor 129, in some embodiments (such as the video-processing CNN 500 of FIG. 5) multiple 2D convolution blocks 300 may be arranged in sequence such that the outputs of one 2D convolution block 300 are provided as input to another 2D convolution block 300. In some such embodiments, the input tensor received by a subsequent 2D convolution block 300 is the 4D output tensor 129 generated the previous 2D convolution block 300, i.e. the tensor remains in a 4D shape to simplify reshaping at the beginning and/or end of method 700 performed by a single 2D convolution block 300. In some such embodiments, the output tensor 129 of a previous 2D convolution block 300 may be received and processed as the 4D spatial input tensor 332 of a subsequent 2D convolution block 300, as described below. In such embodiments, only the first 2D convolution block 300 in the sequence is preceded by the initial reshaping operation 301 of FIG. 3; subsequent 2D convolution blocks 300 in the sequence receive the output tensor 129 of the prior 2D convolution block 300 as the 4D temporal input tensor 336 to be processed.

At 706, a spatial processing sub-block 310 performs 2D convolution on the 4D spatial input tensor 332 to generate a 4D spatial feature tensor. Details of the operations of the spatial processing sub-block 310 are shown in FIG. 4.

Figure 4:
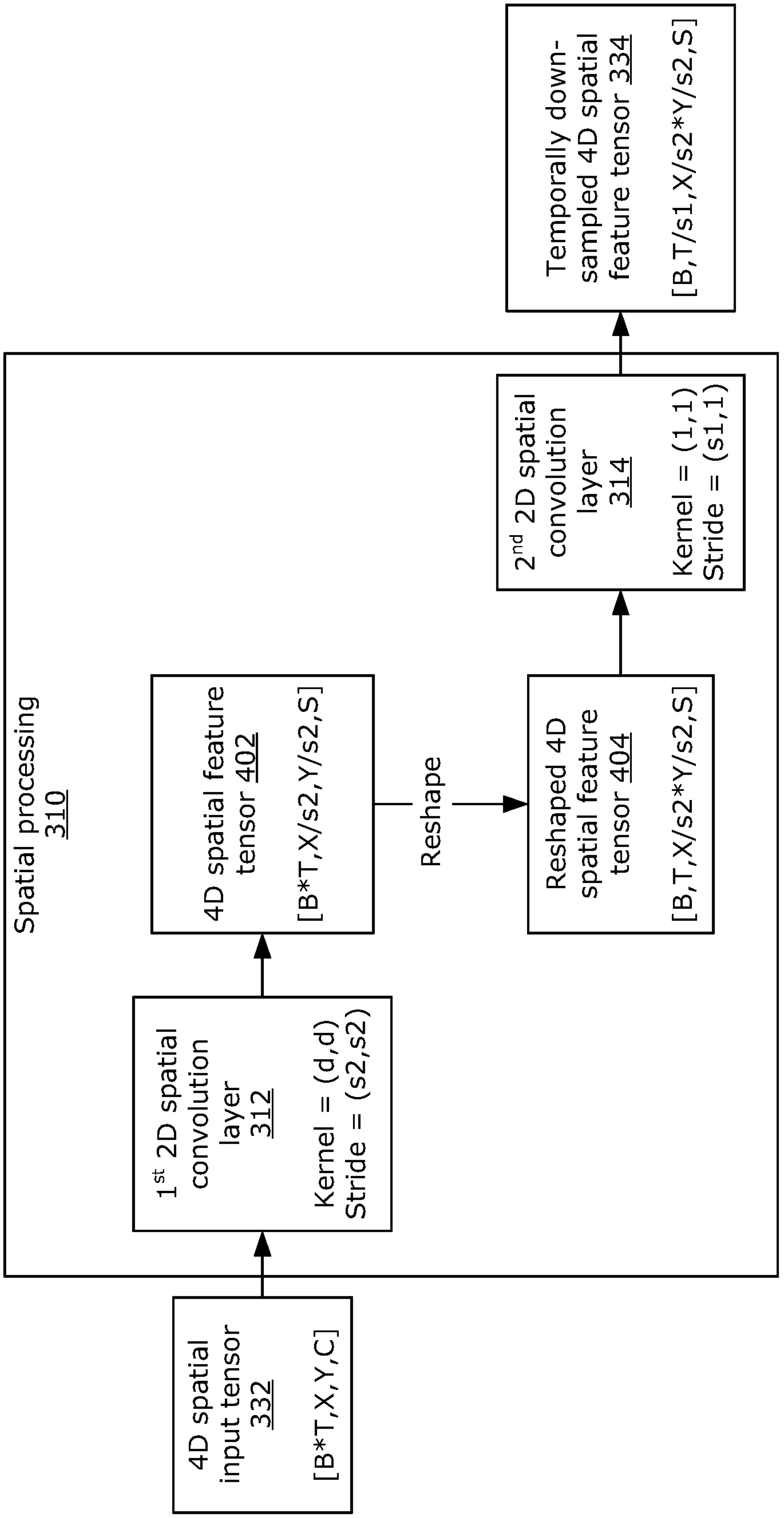
FIG. 4 is a schematic diagram of an example spatial processing sub-block of the example 2D convolution block of FIG. 3.

FIG. 4 shows details of the operation of the spatial processing sub-block 310 of FIG. 3. The 4D spatial input tensor 332, having dimensions [B*T, X, Y, C], is processed by a first 2D spatial convolution layer 312 to generate a 4D spatial feature tensor 402. The first 2D spatial convolution layer 312 performs 2D convolution by applying a 2D spatial convolution kernel of size (d, d) to each channel of each frame of the 4D spatial input tensor 332, thereby generating an output channel of the 4D spatial feature tensor 402. This convolution operation is repeated for each of S1 filters of the first 2D spatial convolution layer 312 to generate S1 output channels of the 4D spatial feature tensor 402. The convolution operations are performed at stride (s2, s2), i.e. the 4D spatial input tensor 332 is effectively down-sampled by a factor of s2 in both the X and Y spatial dimensions. Accordingly, the set of 2D convolution operations performed by the first 2D spatial convolution layer 312 generate a 4D spatial feature tensor 402 having dimensions [B*T, X/s2, Y/s2, S1], wherein X/s2 and Y/s2 indicate that the size of the first spatial dimension and the size of the second spatial dimension are both reduced by a factor s2. The 4D spatial feature tensor 402 therefore has a combined batch index-temporal output dimension B*T, a first spatial output dimension X/s2 having a size equal to the first spatial dimension X of the input tensor 123 divided by the stride s2, a second spatial output dimension Y/s2 having a size equal to the second spatial dimension Y of the input tensor 123 divided by the stride s2, and an output channel dimension S indicating a number of spatial feature maps equal to the number of filters S1. Each channel's kernel has its own distinct set of weights across dimension C.

At 708, the 4D spatial feature tensor 402, having dimensions [B*T, X/s2, Y/s2, S], is reshaped to generate a reshaped 4D spatial feature tensor 334 having dimensions [B, T, X/s2*Y/s2, S]. The reshaping operation of step 708 splits the combined batch index-temporal dimension of the 4D spatial feature tensor 402 back into two separate batch index and temporal dimensions, while also combining the two spatial dimensions X/s2 and Y/s2 into a single combined spatial dimension. The reshaped 4D spatial feature tensor 334 therefore has a batch index dimension B having a size equal to the size of the batch index dimension B of the input tensor 123, a temporal dimension T having a size equal to the size of the temporal dimension T of the input tensor 123, a combined spatial output dimension X/s2*Y/s2 having a size equal to the first spatial dimension X of the input tensor 123, divided by the stride s2, multiplied by the second spatial dimension Y of the input tensor 123, divided by the stride s2, and an output channel dimension S1 indicating a number of spatial feature maps equal to the number of filters S1.

At 710, the reshaped 4D spatial feature tensor 334 is down-sampled in the temporal dimension T using a second 2D spatial convolution layer 314. The second 2D spatial convolution layer 314 applies a number S1 of single-element convolution filters to the reshaped 4D spatial feature tensor 334. Each single-element convolution filter includes a plurality of kernels, each kernel having a single element (i.e. a single weight). The 2D convolution operations is applied at a temporal dimension stride s2, but only with respect to the temporal dimension T; the stride with respect to the combined spatial output dimension X/s2*Y/s2 is 1 (i.e., no down-sampling). The application of the set of S1 filters generates a temporally down-sampled 4D spatial feature tensor 334 having dimensions [B, T/s1, X/s2*Y/s2, S], wherein the temporal dimension T has been downsampled by a factor of s1 to generate a down-sampled temporal dimension of size T/s1.

It will be appreciated that, in some embodiments, step 710 may be omitted; in particular, embodiments in which stride s1 is equal to 1 do not require a further down-sampling in the temporal dimension at step 710 to match the size of the output tensor of the spatial processing sub-block 310 to the size of the output tensor of the 2D temporal convolution layer 320, as described below at steps 714 and 716.

Step 710 completes the processing of the spatial processing sub-block 310, which corresponds to a parallel spatial-processing branch of the 2D convolution block 300 and is shown in detail in FIG. 4. The remaining steps of method 700, beginning with 712, are described with reference to FIG. 3.

At 712, a 4D temporal input tensor 336 is generated based on the input tensor 123. In some embodiments, the 4D temporal input tensor 336 is generated by combining the first spatial dimension X and second spatial dimension Y of the input tensor 123 into a combined spatial dimension, denoted X*Y, having a size X*Y equal to the size of the first spatial dimension X of the input tensor 123 multiplied by the size of the second spatial dimension Y of the input tensor 123. The 4D temporal input tensor 336 may therefore be denoted by [B, T, X,*Y, C]. The pixel two spatial dimensions X, Y may be combined through any of a number of operations, such as by concatenating pixel rows (defined by a constant Y value) of each frame into a single linear dimension, by concatenating pixel columns (defined by a constant X value) of each frame into a single linear dimension, or any other means of combining two spatial dimensions into a single dimension. As shown in FIG. 3, this step 712 is performed by the initial reshaping operation 301.

In other embodiments, the 4D temporal input tensor 336 is not generated directly from the input tensor 123. Instead, the 4D temporal input tensor 336 may be indirectly based on the input tensor 123: specifically, the 4D temporal input tensor 336 may be generated by reshaping the 4D spatial input tensor 332, such that the first dimension of the 4D spatial input tensor 332 is split back into separate batch index and temporal dimensions and the two spatial dimensions of the 4D spatial input tensor 332 are combined. In some embodiments, the generation of the 4D temporal input tensor 336 based on the 4D spatial input tensor 332 allows for 4D tensor outputs of a previous 2D convolution block 300 to be received by a subsequent 2D convolution block 300, with the received 4D tensor being used as the 4D spatial input tensor 332 and reshaped to generate the 4D temporal input tensor 336. Such an embodiments may be used to facilitate communication between sequences of multiple 2D convolution blocks 300 in a CNN, as described below with reference to FIG. 5.

The two alternative means of generating the 4D temporal input tensor 336—either directly based on the input tensor 123 or indirectly, based on the 4D spatial input tensor 332—are shown in FIG. 3 by the pair of dashed arrows.

At 714, a 2D temporal convolution layer 320 performs 2D convolution on the 4D temporal input tensor 336 to generate a 4D temporal feature tensor 338. The 2D temporal convolution layer 320 applies a number S2 of 2D convolution filters to the 4D temporal input tensor 336 to generate S2 temporal feature maps (i.e. output channels). Each 2D convolution filter is applied at a temporal stride s2 with respect to the temporal dimension T, and a stride equal to the square of the temporal stride s2 (i.e. $s2^2$) with respect to the combined spatial dimension X*Y. In other words, the kernels of each filter traverse the 4D temporal input tensor 336 across its [T, X*Y] dimensions to perform the convolution operation, down-sampling by a factor of s2 in the temporal dimension and down-sampling by a factor of $s2^2$ in the combined spatial dimension. In some embodiments, S2=S1, which may allow the output of the 2D temporal convolution layer 320 to be combined with the output of the spatial processing sub-block 310 more easily, as described below. The example embodiment illustrated in FIG. 3 shows all tensors with the values S=S1=S2.

The convolution of each 2D convolution filter with the 4D temporal input tensor 336 generates a 4D temporal feature tensor 338, denoted [B, T/s1, X/s2*Y/s2, S2], having a batch index output dimension B, a temporal dimension T/s1 having a size equal to the temporal dimension T of the input tensor 123 divided by the temporal stride s1, a combined spatial output dimension X/s2*Y/s2 having a size equal to the first spatial dimension X of the input tensor 123, divided by the spatial stride s2, multiplied by the second spatial dimension Y of the input tensor 123, divided by the spatial stride s2 (or, alternative, equal to X multiplied by Y divided by the square $s2^2$ of the spatial stride s2), and an output channel dimension S2 indicating a number of temporal feature maps equal to the number of filters S2.

At 716, the 4D temporal feature tensor 338 and the temporally down-sampled 4D spatial feature tensor 334 are added, combined, or otherwise processed together to generate the output tensor 129. Because the 4D temporal feature tensor 338 and the temporally down-sampled 4D spatial feature tensor 334 have the same dimensionality (4 dimensions) and, in some embodiments, the same size ([B, T/s1, X/s2*Y/s2, S] assuming an embodiment in which S=S1=S2), combining them together may not require reshaping or resizing operations, thereby increasing the efficiency of the 2D convolution block 300.

In some embodiments, the 4D temporal feature tensor 338 and the temporally down-sampled 4D spatial feature tensor 334 are combined through elementwise addition, resulting in an output tensor 129 of the same dimensions as the 4D temporal feature tensor 338 and the temporally down-sampled 4D spatial feature tensor 334, namely [B, T/s1, X/s2*Y/s2, S].

Method 700, as describe above in embodiments using 2D convolution block 300, may therefore achieve one or more advantages over existing approaches to video-processing CNNs. The reshaping steps used in the parallel structure of the 2D convolution block 300 enable the use of 4D tensors throughout the entire 2D convolution block 300 instead of 5D tensors. The 4D tensors used in both parallel branches of the 2D convolution block 300 (i.e. the spatial processing sub-block 310 and the 2D temporal convolution layer 320) will have the same shapes after processing (i.e. [B, T/s1, X/s2*Y/s2, S]), which allows the output tensors of each branch to be combined efficiently by elementwise adding. Furthermore, using only 2D kernels in the convolution layers 312, 314, 320 results in efficient spatial and temporal processing (i.e. spatial and temporal feature extraction) with significantly lower memory consumption than 3D convolution approaches. The efficiency and low memory consumption of described embodiments may enable deployment of video-processing CNNs in real-time applications, especially for edge devices.

FIG. 5 shows an example video-processing CNN 500 configured to incorporate multiple 2D convolution blocks 300 as described above with reference to FIG. 3. The video-processing CNN 500 mirrors the structure of some conventional video-processing CNNs using 3D convolution: in a conventional video-processing CNN, video data is first processed by a 2D preprocessing module (sometimes referred to as a “2DNet”) of the video-processing CNN 500, and the preprocessed output of the 2D preprocessing module 502 is provided to a sequence of 3D convolution blocks (sometimes referred to as a “3DNet”), whose output is processed by an output layer 138 of a fully connected block 132 to generate prediction information 139. However, in the example embodiments illustrated in FIG. 5, each 3D convolution block in the sequence of 3D convolution blocks (i.e. “3DNet”) is replaced with a 2D convolution block 300 as described above with reference to FIG. 3.

Thus, in the video-processing CNN 500 of FIG. 5, video data (i.e. batch 121 of video data samples) is first processed by a 2D preprocessing module 502 of the video-processing CNN 500, and the preprocessed output of the 2D preprocessing module 502 is provided to a sequence of 2D convolution blocks 300. The 2D convolution blocks 300 are connected in sequence: i.e. the output tensor 129 of a previous 2D convolution block 300 is provided as an input tensor 123 or, as described above, a 4D spatial input tensor 332, to a subsequent 2D convolution block 300. The 2D convolution blocks 300 are also interconnected by skip connections 504 to preserve the output of non-adjacent previous 2D convolution blocks 300 at later 2D convolution blocks 300 of the video-processing CNN 500. In the example video-processing CNN 500 shown in FIG. 5, the sequence of 2D convolution blocks 300 includes a total of twelve 2D convolution blocks 300 (i.e. 6 pairs of 2D convolution blocks 300); it will be appreciated that, in some embodiments, the number of 2D convolution blocks 300 may be greater or less than twelve.

In an example embodiment, the 2D preprocessing module 502 obtains the batch 121 of video data samples as a 5D tensor of size [B=8, T=16, X=256, Y=256, C=3], which means 8 video clips with 16 frames each, the frames being of size 256 by 256 pixels and having 3 channels of color (red, blue and green). The 5D input tensor may be generated by a preprocessing block 122 (not shown), as in the example CNN 120 of FIG. 2. The 2D preprocessing module 502 applies 2D convolution to each frame independently, thereby generating a smaller 5D tensor of size [8, 16, 28, 28, 96]. This smaller 5D tensor is used as the 5D input tensor 123 to the first 2D convolution block 300.

In the example of FIG. 5, the first 2D convolution block 300 is preceded by the initial reshaping operation 301, which reshapes the 5D input tensor 123 to generate the 4D temporal input tensor 336. Each subsequent 2D convolution block 300 receives the output tensor 129 of the previous 2D convolution block 300 as its input (i.e., the 4D temporal input tensor 336). Thus, each 2D convolution block 300 generates an output tensor 129 of size [B, T/s1, X/s2*Y/s2, S] relative to the size of its respective input tensor. In an example embodiment, the values of s1 and/or s2 may vary between 2D convolution blocks 300; for example, the sequence of twelve 2D convolution blocks 300 shown in FIG. 5 may consist of ten 2D convolution blocks 300 having s1=s2=1 (i.e. no spatial or temporal down-sampling), and two 2D convolution block 300 having s1=s2=2. For example, the fifth and ninth 2D convolution blocks 300 in the sequence may have s1=s2=2. In addition, in some embodiments, the output channel dimension size S varies from one 2D convolution block 300 to another; thus, in the continued example embodiment, S=128 for the first four 2D convolution blocks 300 in the sequence, S=256 for the next four 2D convolution blocks 300, and S=512 for the final four 2D convolution blocks 300. In such an example embodiment, the first 2D convolution block 300 receives the 5D input tensor 123 having dimensions [8, 16, 28, 28, 96]. The 5D input tensor 123 is reshaped by the initial reshaping operation 301 into a 4D temporal input tensor 336 of dimensions [8, 16, 28*28, 96]. The first 2D convolution block 300 generates an output tensor 129 of dimensions [8, 16, 28*28, 128]; these dimensions of the output tensor 129 would remain the same for the outputs of each of the first four first 2D convolution blocks 300. The output tensor of the fifth first 2D convolution block 300 would be [8, 8, 14*14, 256], and these dimensions would remain the same for the fifth through eighth first 2D convolution blocks 300. The output tensor 129 of the ninth first 2D convolution block 300 would have dimensions [8, 4, 7*7, 512], and these dimensions would remain the same through the end of the sequence, such that the final, twelfth first 2D convolution block 300 would generate an output tensor 129 having dimensions [8, 4, 7*7, 512].

FIG. 6 shows a final 2D convolution block 300 of the video-processing CNN 500 of FIG. 5 providing its output tensor to a fully connected block 602 of the video-processing CNN 500 to generate prediction information 139, in the context of a video-processing CNN 500 trained to perform a classification task. It will be appreciated that some embodiments may train the video-processing CNN 500 to perform non-classification computer vision tasks, such as video quality enhancement; in such embodiments, the outputs of the fully-connected block 602 and its component layers described below may be different. It will also be appreciated that the operation of the fully connected block 602 of FIG. 6 differs from the conventional fully-connected block 132 described with reference to FIG. 2 above.

The output tensor 129 of the final 2D convolution block 300 is shown as a 4D tensor having (in the example continued from above) size [B=8, T=4, X*Y=49, S=512]. A pooling layer 604 processes the output tensor 129 to collapse all the temporal and spatial dimensions into a tensor of dimensions [B=8, T=1, X*Y=1, S=512] and only keep the feature (or channel) dimension. Finally, this tensor is reshaped into a channel tensor 606 of dimensions [B=8, S=512] by simply dropping the dimensions with size 1. A fully-connected layer 608 then processes the channel tensor 606 to map the S=512 channels to N categories or classes of a classification task which the video-processing CNN 500 has been trained to perform, thereby generating a logits tensor of dimensions [B,N] indicating a probability distribution across the N classes for each of the B video clips. The logits may be used as the prediction information 139 generated by the video-processing CNN 500, or in some embodiments the logits may be further processed to generate the prediction information 139, for example by application of a SoftMax algorithm to generate prediction information 139 in the form of a matrix of size [B=8,1], which means for each of the 8 video clips in the batch 121 processed by the CNN 500, the prediction information 139 indicates a single number identifying one of the N classes or categories which the CNN 500 predicts with respect to the respective video clip. Thus, for example, in a video-processing CNN 500 trained to perform a human behavior classification computer vision task, the prediction information 139 may indicate, for each video clip in the input batch 121 of video data samples, a specific human behavior being visibly performed in the respective video clip.

Experiments have been performed using a video-processing CNN 500 as described in the extended example above. The video data used to assemble batches 121 of video data samples was the standard UCF101 action recognition dataset, consisting of more than 13,000 videos from 101 action categories including: applying makeup, swing, bowling, sky diving, surfing, playing piano, etc.

The experimental results measured two performance metrics, using a conventional 3D convolutional video-processing CNN ("Conv3D") as a baseline: a percentage reduction in the number of weights (i.e. learnable parameters) of the CNN, and a speed and accuracy improvement metric defined as $$\frac{\text{Speed of example embodiment}}{\text{Speed of } \mathit{Conv3D\ CNN}} \times \frac{\text{Accuracy of example embodiment}}{\text{Accuracy of } \mathit{Conv3D\ CNN}}.$$

The example embodiment tested exhibited approximately a 13% improvement in the speed and accuracy metric over the Conv3D CNN, with a reduction of approximately 50% in the number of weights used in the CNN. Thus, the tested embodiment not only performed with significantly higher speed and accuracy, but it was also much more memory efficient. Notably, the various other existing approaches described in the Background section were also tested performing the same task on the same data using the same metrics: only the Rank-1 approach achieved a greater reduction in the number of weights than the example embodiment (approximately a 90% reduction relative to Conv3D), but this reduction in the number of weights was associated with only approximately a 4% increase in the speed and efficiency metric relative to Conv3D. Each other existing approach (R(2+1)D, P3D-C, P3D-B, P3D-A) used more weights than the tested embodiment, and exhibited smaller gains in the speed and accuracy metric than the tested embodiment.

As described above, some embodiments of the 2D convolution block 300 may combine the 4D temporal feature tensor 338 and the temporally down-sampled 4D spatial feature tensor 334 using operations other than elementwise addition. In some embodiments, a concatenation operation is used instead, by concatenating 3D tensors along the output channel dimension S. This technique allows the 4D temporal feature tensor 338 and the temporally down-sampled 4D spatial feature tensor 334 to have different sizes in their final dimension, i.e. S1 not equal to S2. Thus, a 4D temporal feature tensor 338 of size [B, T/s, X/s*Y/s, S2] can be concatenated to a temporally down-sampled 4D spatial feature tensor 334 of size [B, T/s, X/s*Y/s, S1] to generate an output tensor of size [B, T/s, X/s*Y/s, S1+S2]. It will be appreciated that, in such embodiments, it is still required that 51=s2=s. Furthermore, it is possible to apply this technique even in embodiments in which S1=S2=S, to generate an output tensor of size [B, T/s, X/s*Y/s, 2*S].

Concatenation of the outputs of the two branches (i.e. spatial processing sub-block 310 and 2D temporal convolution layer 320), as described directly above, may increase the feature space dimension (i.e. the number of output channels) of the tensors passed between convolution blocks, and hence the computational complexity and memory usage of the video-processing CNN 500 may increase. However, the accuracy could be slightly higher than in embodiments using elementwise addition to combine the outputs of the two branches.

Human behavior or human activity classification or recognition is a common domain for which video-processing CNNs are trained and used. However, similar techniques are also widely used for feature representational mapping, which is an essential block in the early stage of a wide range of deep learning architectures used in the field of video processing. Hence, example embodiments described herein can be used for efficient, memory friendly and accurate implementation of video-processing CNNs. Some of the problem domains to which these embodiments may be applied include autonomous driving, intelligent transportation systems, violence detection in CCTV, and flaw detection in high-speed production lines.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

The invention claimed is:

1. A method for performing a computer vision task comprising:

generating an output tensor from video data having a batch of video samples using a neural network that is constructed and arranged for performing the computer vision task during training or inference, the neural network including one or more neural network blocks comprising:

a preprocessing neural network block configured to:

receive the batch of video samples and generate an input tensor from the video data, the input tensor comprising a five-dimensional (5D) tensor having:

a batch index dimension of size B indicating individual video data samples in the batch of video data samples;

a temporal dimension of size T;

a first spatial dimension;

a second spatial dimension; and an input channel dimension;

reshape the input tensor by combining the batch index dimension and temporal dimension of the input tensor into a combined batch index-temporal dimension having a size B*T to generate a four-dimensional (4D) spatial input tensor;

reshape the input tensor by combining a plurality of 3D tensors defined by the batch index dimension, temporal dimension, and input channel dimension of the input tensor to form a 4D temporal input tensor having a combined spatial dimension based on the first spatial dimension and the second spatial dimension of the input tensor;

a first convolutional block having at least a convolutional layer, the convolutional layer of the first convolutional block configured to execute a two-dimensional (2D) convolution on the 4D spatial input tensor to generate a 4D spatial feature tensor;

a second convolutional block having at least a convolutional layer, the convolutional layer of the second convolutional block configured to execute a 2D convolution on the 4D temporal input tensor to generate a 4D temporal feature tensor; and a fully connected block having at least an output layer configured to process the 4D spatial feature tensor and the 4D temporal feature tensor to generate the output tensor;

deploying the neural network to perform the computer vision task for the batch of video data samples based on the generated output tensor.

2. The method of claim 1, wherein:

combining the batch index dimension and temporal dimension of the input tensor comprises concatenating a plurality of three-dimensional (3D) tensors defined by the first spatial dimension, second spatial dimension, and input channel dimension to form the four-dimensional spatial input tensor; and the combined batch index-temporal dimension has a size equal to the size of the batch index dimension of the input tensor multiplied by the size of the temporal dimension of the input tensor.

3. The method of claim 1, wherein:

the combined spatial dimension has a size equal to the size of the first spatial dimension of the input tensor multiplied by the size of the second spatial dimension of the input tensor.

4. The method of claim 1, wherein performing 2D convolution on the 4D spatial input tensor to generate the 4D spatial feature tensor comprises:

applying a first number of 2D convolution filters to the 4D spatial input tensor, at a stride equal to a second number with respect to the first spatial dimension and the second spatial dimension, to generate the 4D spatial feature tensor having:

a combined batch index-temporal output dimension;

a first spatial output dimension, having a size equal to the first spatial dimension of the input tensor divided by the second number;

a second spatial output dimension, having a size equal to the second spatial dimension of the input tensor divided by the second number; and an output channel dimension indicating a number of spatial feature maps equal to the first number.

5. The method of claim 4, wherein performing 2D convolution on the 4D temporal input tensor to generate the 4D temporal feature tensor comprises:

applying a third number of 2D convolution filters to the 4D temporal input tensor, at a stride equal to a fourth number with respect to the temporal dimension, and a stride equal to the square of the second number with respect to the combined spatial dimension, to generate the 4D temporal feature tensor having:

a batch index output dimension;

a temporal dimension, having a size equal to the temporal dimension of the input tensor divided by the fourth number;

a combined spatial output dimension, having a size equal to the first spatial dimension of the input tensor, divided by the second number, multiplied by the second spatial dimension of the input tensor, divided by the second number; and an output channel dimension indicating a number of temporal feature maps equal to the third number.

6. The method of claim 4, wherein processing the 4D spatial feature tensor and the 4D temporal feature tensor to generate the output tensor comprises:

reshaping the 4D spatial feature tensor to generate a reshaped 4D spatial feature tensor, having:

a batch index dimension having a size equal to the size of the batch index dimension of the input tensor;

a temporal dimension having a size equal to the size of the temporal dimension of the input tensor;

a combined spatial output dimension, having a size equal to:

the first spatial dimension of the input tensor, divided by the second number, multiplied by the second spatial dimension of the input tensor, divided by the second number; and an output channel dimension indicating a number of spatial feature maps equal to the first number; and processing the reshaped 4D spatial feature tensor and the 4D temporal feature tensor to generate the output tensor.

7. The method of claim 6, wherein processing the reshaped 4D spatial feature tensor and the 4D temporal feature tensor to generate the output tensor comprises:

applying a number of single-element convolution filters equal to the first number to the reshaped 4D spatial feature tensor, at a temporal dimension stride equal to the fourth number with respect to the temporal dimension, to generate a temporally down-sampled 4D spatial feature tensor; and processing the temporally down-sampled 4D spatial feature tensor and the 4D temporal feature tensor to generate the output tensor.

8. The method of claim 7, wherein processing the temporally down-sampled 4D spatial feature tensor and the 4D temporal feature tensor to generate the output tensor comprises adding the elements of the temporally down-sampled 4D spatial feature tensor to the respective elements of the 4D temporal feature tensor to generate the output tensor.

9. The method of claim 1, wherein:

combining the batch index dimension and temporal dimension of the input tensor comprises concatenating a plurality of three-dimensional (3D) tensors defined by the first spatial dimension, second spatial dimension, and input channel dimension to form the four-dimensional spatial input tensor;

the combined batch index-temporal dimension has a size equal to the size of the batch index dimension of the input tensor multiplied by the size of the temporal dimension of the input tensor;

the combined spatial dimension has a size equal to the size of the first spatial dimension of the input tensor multiplied by the size of the second spatial dimension of the input tensor;

performing 2D convolution on the 4D spatial input tensor to generate the 4D spatial feature tensor comprises:

applying a first number of 2D convolution filters to the 4D spatial input tensor, at a stride equal to a second number with respect to the first spatial dimension and the second spatial dimension, to generate the 4D spatial feature tensor having:

a combined batch index-temporal output dimension;

a first spatial output dimension, having a size equal to the first spatial dimension of the input tensor divided by the second number;

a second spatial output dimension, having a size equal to the second spatial dimension of the input tensor divided by the second number; and an output channel dimension indicating a number of spatial feature maps equal to the first number;

performing 2D convolution on the 4D temporal input tensor to generate the 4D temporal feature tensor comprises:

applying a third number of 2D convolution filters to the 4D temporal input tensor, at a stride equal to a fourth number with respect to the temporal dimension, and a stride equal to the square of the fourth number with respect to the combined spatial dimension, to generate the 4D temporal feature tensor having:

a batch index output dimension;

a temporal dimension, having a size equal to the temporal dimension of the input tensor divided by the fourth number;

a combined spatial output dimension, having a size equal to the first spatial dimension of the input tensor, divided by the fourth number, multiplied by the second spatial dimension of the input tensor, divided by the fourth number; and an output channel dimension indicating a number of temporal feature maps equal to the third number;

processing the 4D spatial feature tensor and the 4D temporal feature tensor to generate the output tensor comprises:

reshaping the 4D spatial feature tensor to generate a reshaped 4D spatial feature tensor, having:

a batch index dimension having a size equal to the size of the batch index dimension of the input tensor;

a temporal dimension having a size equal to the size of the temporal dimension of the input tensor;

a combined spatial output dimension, having a size equal to:

the first spatial dimension of the input tensor, divided by the second number, multiplied by the second spatial dimension of the input tensor, divided by the second number; and an output channel dimension indicating a number of spatial feature maps equal to the first number;

applying a number of single-element convolution filters equal to the first number to the reshaped 4D spatial feature tensor, at a temporal dimension stride equal to the fourth number with respect to the temporal dimension, to generate a temporally down-sampled 4D spatial feature tensor; and adding the elements of the temporally down-sampled 4D spatial feature tensor to the respective elements of the 4D temporal feature tensor to generate the output tensor; and the first number is equal to the third number.

10. A system for performing a computer vision task, the system comprising:

a processor device;

and a memory storing machine-executable instructions which, when executed by the processor device, cause the system to:

generate an output tensor from video data having a batch of video samples using a neural network that is constructed and arranged for performing the computer vision task during training or inference, the neural network including one or more neural network blocks comprising:

a preprocessing neural network block configured to:

receive the batch of video samples and generate an input tensor from the video data, the input tensor comprising a five-dimensional (5D) tensor having:

a batch index dimension of size B indicating individual video data samples in the batch of video data samples;

a temporal dimension of size T;

a first spatial dimension;

a second spatial dimension; and an input channel dimension;

reshape the input tensor by combining the batch index dimension and temporal dimension of the input tensor into a combined batch index-temporal dimension having a size B*T to generate a four-dimensional (4D) spatial input tensor;

reshape the input tensor by combining a plurality of 3D tensors defined by the batch index dimension, temporal dimension, and input channel dimension of the input tensor to form a 4D temporal input tensor having a combined spatial dimension based on the first spatial dimension and the second spatial dimension of the input tensor;

a first convolutional block having at least a convolutional layer, the convolutional layer of the first convolutional block configured to execute a two-dimensional (2D) convolution on the 4D spatial input tensor to generate a 4D spatial feature tensor;

a second convolutional block having at least a convolutional layer, the convolutional layer of the second convolutional block configured to execute a 2D convolution on the 4D temporal input tensor to generate a 4D temporal feature tensor; and a fully connected block having at least an output layer configured to process the 4D spatial feature tensor and the 4D temporal feature tensor to generate the output tensor, the output tensor comprising a 5D tensor;

deploying the neural network to perform the computer vision task for the batch of video data samples based on the generated output tensor.

11. The system of claim 10, wherein:

generating the 4D spatial input tensor comprises concatenating a plurality of three-dimensional (3D) tensors defined by the first spatial dimension, second spatial dimension, and input channel dimension of the input tensor to form the 4D spatial input tensor; and the combined batch index-temporal dimension has a size equal to the size of the batch index dimension of the input tensor multiplied by the size of the temporal dimension of the input tensor.

12. The system of claim 10, wherein:

the combined spatial dimension has a size equal to the size of the first spatial dimension of the input tensor multiplied by the size of the second spatial dimension of the input tensor.

13. The system of claim 10, wherein performing 2D convolution on the 4D spatial input tensor to generate the 4D spatial feature tensor comprises:

applying a first number of 2D convolution filters to the 4D spatial input tensor, at a stride equal to a second number with respect to the first spatial dimension and the second spatial dimension, to generate the 4D spatial feature tensor having:

a combined batch index-temporal output dimension;

a first spatial output dimension, having a size equal to the first spatial dimension of the input tensor divided by the second number;

a second spatial output dimension, having a size equal to the second spatial dimension of the input tensor divided by the second number; and an output channel dimension indicating a number of spatial feature maps equal to the first number.

14. The system of claim 13, wherein performing 2D convolution on the 4D temporal input tensor to generate the 4D temporal feature tensor comprises:

applying a third number of 2D convolution filters to the 4D temporal input tensor, at a stride equal to a fourth number with respect to the temporal dimension, and a stride equal to the square of the second number with respect to the combined spatial dimension, to generate the 4D temporal feature tensor having:

a batch index output dimension;

a temporal dimension, having a size equal to the temporal dimension of the input tensor divided by the fourth number;

a combined spatial output dimension, having a size equal to the first spatial dimension of the input tensor, divided by the second number, multiplied by the second spatial dimension of the input tensor, divided by the second number; and an output channel dimension indicating a number of temporal feature maps equal to the third number.

15. The system of claim 13, wherein processing the 4D spatial feature tensor and the 4D temporal feature tensor to generate the output tensor comprises:

reshaping the 4D spatial feature tensor to generate a reshaped 4D spatial feature tensor, having:

a batch index dimension having a size equal to the size of the batch index dimension of the input tensor;

a temporal dimension having a size equal to the size of the temporal dimension of the input tensor;

a combined spatial output dimension, having a size equal to:

the first spatial dimension of the input tensor, divided by the second number, multiplied by the second spatial dimension of the input tensor, divided by the second number; and an output channel dimension indicating a number of spatial feature maps equal to the first number; and processing the reshaped 4D spatial feature tensor and the 4D temporal feature tensor to generate the output tensor.

16. The system of claim 15, wherein processing the reshaped 4D spatial feature tensor and the 4D temporal feature tensor to generate the output tensor comprises:

applying a number of single-element convolution filters equal to the first number to the reshaped 4D spatial feature tensor, at a temporal dimension stride equal to the fourth number with respect to the temporal dimension, to generate a temporally down-sampled 4D spatial feature tensor; and processing the temporally down-sampled 4D spatial feature tensor and the 4D temporal feature tensor to generate the output tensor.

17. The system of claim 16, wherein processing the temporally down-sampled 4D spatial feature tensor and the 4D temporal feature tensor to generate the output tensor comprises adding the elements of the temporally down-sampled 4D spatial feature tensor to the respective elements of the 4D temporal feature tensor to generate the output tensor.

18. The system of claim 10, wherein:

combining the batch index dimension and temporal dimension of the input tensor comprises concatenating a plurality of three-dimensional (3D) tensors defined by the first spatial dimension, second spatial dimension, and input channel dimension to form the four-dimensional spatial input tensor;

the combined batch index-temporal dimension has a size equal to the size of the batch index dimension of the input tensor multiplied by the size of the temporal dimension of the input tensor;

the combined spatial dimension has a size equal to the size of the first spatial dimension of the input tensor multiplied by the size of the second spatial dimension of the input tensor;

performing 2D convolution on the 4D spatial input tensor to generate the 4D spatial feature tensor comprises:

applying a first number of 2D convolution filters to the 4D spatial input tensor, at a stride equal to a second number with respect to the first spatial dimension and the second spatial dimension, to generate the 4D spatial feature tensor having:

a combined batch index-temporal output dimension;

a first spatial output dimension, having a size equal to the first spatial dimension of the input tensor divided by the second number;

a second spatial output dimension, having a size equal to the second spatial dimension of the input tensor divided by the second number; and an output channel dimension indicating a number of spatial feature maps equal to the first number;

performing 2D convolution on the 4D temporal input tensor to generate the 4D temporal feature tensor comprises:

applying a third number of 2D convolution filters to the 4D temporal input tensor, at a stride equal to a fourth number with respect to the temporal dimension, and a stride equal to the square of the second number with respect to the combined spatial dimension, to generate the 4D temporal feature tensor having:

a batch index output dimension;

a temporal dimension, having a size equal to the temporal dimension of the input tensor divided by the fourth number;

a combined spatial output dimension, having a size equal to the first spatial dimension of the input tensor, divided by the second number, multiplied by the second spatial dimension of the input tensor, divided by the second number; and an output channel dimension indicating a number of temporal feature maps equal to the third number;

processing the 4D spatial feature tensor and the 4D temporal feature tensor to generate the output tensor comprises:

reshaping the 4D spatial feature tensor to generate a reshaped 4D spatial feature tensor, having:

a batch index dimension having a size equal to the size of the batch index dimension of the input tensor;

a temporal dimension having a size equal to the size of the temporal dimension of the input tensor;

a combined spatial output dimension, having a size equal to:

the first spatial dimension of the input tensor, divided by the second number, multiplied by the second spatial dimension of the input tensor, divided by the second number; and an output channel dimension indicating a number of spatial feature maps equal to the first number;

applying a number of single-element convolution filters equal to the first number to the reshaped 4D spatial feature tensor, at a temporal dimension stride equal to the fourth number with respect to the temporal dimension, to generate a temporally down-sampled 4D spatial feature tensor; and adding the elements of the temporally down-sampled 4D spatial feature tensor to the respective elements of the 4D temporal feature tensor to generate the output tensor; and the first number is equal to the third number.

19. A non-transitory processor-readable medium having machine-executable instructions stored thereon which, when executed by a processor of a device, cause the device to perform the steps of the method of claim 1.

20. The method of claim 1, wherein performing the computer vision task for the batch of video data samples based on the generated output tensor comprises:

performing a non-classification computer vision task for the batch of video data samples based on the generated output tensor, the non-classification computer task including improving a video quality of video frames in the batch of video data samples.

* * * * *